Reissued Oct. 17, 1939

Re. 21,240

UNITED STATES PATENT OFFICE 21,240

MANUFACTURE OF SENSITIZED PHOTOGRAPHIC PRINTING PAPER AND CLOTH

John Holden, Stockport, England, assignor to Keuffel & Esser Company, Hoboken, N. J., a corporation of New Jersey No Drawing. Original application No. 2,158,422, dated May 16, 1939, Serial No. 192,891, February 26, 1938. Application for reissue August 25, 1939, Serial No. 291,949. In Great Britain February 27, 1937

14 Claims. (Cl. 95—6)

This invention has reference to the manufacture of sensitized photographic printing papers and cloths and refers particularly to papers and cloths of the type used for making what are called "blue prints" by the ferroprussiate process, and has for its object to provide an improved paper in which a better contrast between the white lines and the blue background is obtained and which paper will also keep without deterioration for long periods.

The present invention produces an improved paper or cloth which can be developed or washed in the usual manner but is also particularly suitable for producing prints by the so called "semi-dry" process of development in which a thin film of liquid is applied as a developer to the surface as distinct from the common "wet or washing" developing operation.

According to this invention a paper or cloth (hereinafter referred to as paper) for the making of "blue-prints" is made by applying to the surface one or more solutions in neutral or alkaline conditions, containing an iron salt, an iron-cyanogen compound which may be either a ferricyanide, a ferro-cyanide, or both, buffer salts and a nitrite, in one solution, or the nitrite being applied in a separate solution.

The invention can be carried out in several ways as hereinafter exemplified, and the nitrite used is a nitrite of a suitable metal or base, such as sodium, potassium or ammonium nitrite, which will act as an acid absorbing agent when called upon to do so; that is to say it has a quantitive reaction with acids or acidic salts with which it comes in contact before exposure to light and consequently will keep the paper or cloth in the required neutral or alkaline condition.

The blue print coating solution before application to the paper is preferably slightly alkaline or in other words has a pH value of above 7, but it may be neutral as that term is understood in this art and used in this specification which covers those solutions with a hydrogen ion concentration of at least one unit—as measured in pH values—on either side of the theoretically neutral point of pH 7. Substantially all blue print coatings on the usual paper bases when washed off produce solutions which have hydrogen ion concentrations—measured by pH values—that are substantially more acid, i. e., lower, than the hydrogen ion concentration of the original solutions. The hydrogen ion concentration of the dry coating on the paper cannot be measured.

Blue print coatings applied according to the teachings of this specification, whether neutral or alkaline solutions before application, are preserved against deterioration after application.

The nitrite also will counteract the acid nature of some of the oxidizing agents which may be applied to the paper prior to exposure to light to aid intensification and will also counteract the acidity of prints when developed by acidic or acid-containing developers by the semi-dry process in which a developer is applied to the exposed print.

In addition to the acid absorbing properties, the nitrite when in contact with acids or acidic salts has an oxidizing action which in some instances may assist in the intensification of the print.

A chlorate may be used to provide a mild oxidizing action.

The coated or sensitive surface may be coated with a developing or intensifying oxidizing agent in the form of a fine dry powder, such a powder being e. g. a peroxide of an alkaline earth metal, a hypochlorite, a persulphate, a chlorine substitution derivative of an aromatic sulphonamide or a chromate.

Examples of working according to the invention are as follows:

*Example I*

A suitable paper is coated in any convenient manner with a solution of the following composition:

200 gms. ferric ammonium oxalate.
15 gms. borax are dissolved in water and made up to a volume of 500 ccs. and to this solution there are added—
30 gms. potassium ferrocyanide.
25 gms. potassium ferricyanide.
30 gms. potassium oxalate dissolved in water and made up to a volume of 450 ccs.
25 gms. sodium nitrite dissolved in the above mixed solutions.

The total volume of the finished solution is made up to 1000 ccs.

*Example II*

A suitable raw paper is coated on one side with a light sensitive ferroprussiate or blue print solution, according to Example I and dried, the dry sensitive surface is then dusted over in any convenient manner such as by means of a felt pad with a dry powder of the following composition:

100 gms. P. sulphondichloraminobenzoic acid.
400 gms. rice starch powder.

Excess of powder is removed by means of fast rotating brushes in light contact with the powdered surface. The powder adheres in and/or on the surface in the form of a firm layer not easily removed by mechanical friction.

When exposed to light under a design the prints are washed in water, development takes place in the usual manner but afterwards the oxidising agent being only slightly soluble commences to act on the light blue background and rapidly proceeds until a very deep blue is obtained, this oxidising or intensifying action being accelerated by heat.

*Example III*

A suitable paper is coated in any convenient manner with a solution of the following composition:

400 gms. ferric ammonium oxalate.
50 gms. borax.

The above are dissolved in water to a volume of 1000 ccs. to which is added:

140 gms. potassium ferrocyanide.
30 gms. potassium ferricyanide.
125 gms. potassium oxalate (neutral).
250 gms. potassium chlorate.
Water to a volume of 3000 ccs.

To the mixed cold solutions there is added:

100 gms. sodium nitrite.

A paper so prepared is developed after exposure to light under a design with a solution of the following composition:

100 gms. zinc sulphate.
100 gms. mono sodium orthophosphate.
100 gms. magnesium sulphate.
30 gms. ammonium persulphate.
Water to a volume of 1000 ccs.

The solution is preferably applied by mechanical means such as by contact with a roller revolving in a bath of the solution, excess being removed by scraper or squeegee rollers.

In Example III it is necessary to apply sufficient developer not only to fix the lines, and bring up the background, but also to stabilize the background, as unless this is done the print may fade under a bright light.

Care must be taken therefore to use an adequate quantity of developer and at first it may be necessary to make one or two tests to arrive at the most suitable quantity to make the best and most lasting prints.

*Example IV*

A suitable paper is coated in any convenient manner with a solution of:

50 gms. soluble starch.
25 gms. sodium nitrite.
1 litre of water.

and the paper is then dried, and afterwards coated with the solution in Example I without the nitrite.

The nitrite and the chlorate may be in non-aqueous solutions and may be applied at any convenient stage. Care must be taken by the use of buffer salts, mild alkalis or other suitable means to prevent its, or their premature decomposition.

It has been found that a chlorate and a nitrite together are particularly useful in the manufacture of "blue print papers" which it is desired to develop without the usual washing operation. The chlorate stabilizes the blue background and the nitrite assists in the formation of clear white lines, and also helps to keep the paper in good condition before use.

What I claim as my invention and desire to secure by Letters Patent is:

1. "Blue print" paper suitable for producing prints by the semi-dry development process having on its surface a non-acid coating comprising a soluble iron salt, an iron-cyanogen compound, a buffer salt and a soluble nitrite.

2. "Blue print" paper as defined in claim 1, in which the soluble iron salt is a ferric salt and the iron-cyanogen compound is a ferrocyanide.

3. "Blue print" paper as defined in claim 1, in which the soluble iron salt is a ferrous salt and the iron-cyanogen compound is a ferri-cyanide.

4. "Blue print" as defined in claim 1, in which the coating comprises both ferro- and ferricyanides.

5. "Blue print" paper as defined in claim 1, in which the coating comprises a soluble chlorate.

6. "Blue print" paper as defined in claim 1, in which the nitrite is a nitrite of an alkali metal.

7. A method for preparing blue print paper which comprises applying to the paper a non-acid coating solution containing a soluble iron salt, an iron-cyanogen compound, a buffer salt and a soluble nitrite, drying the coated paper, and applying an oxidizing developing agent in the form of a fine dry powder.

8. A blue print paper having on its surface a blue print coating comprising a soluble iron salt and an iron-cyanogen compound together with a soluble nitrite.

9. A blue print paper having on its surface a blue print coating comprising a soluble iron salt, an iron-cyanogen compound and a buffer salt together with a soluble nitrite.

10. A blue print paper having on its surface a blue print coating comprising a soluble iron salt and an iron-cyanogen compound together with a soluble nitrite and an oxidizing agent.

11. A blue print paper having on its surface a blue print coating comprising a soluble iron salt, an iron-cyanogen compound and an alkali metal oxalate together with an alkali metal nitrite.

12. A method for preparing blue print paper which comprises applying to the paper a coating solution containing a soluble iron salt, an iron-cyanogen compound, a buffer salt, and a soluble nitrite and drying the coated paper.

13. A method for preparing blue prints which comprises applying to the paper a coating solution containing a soluble iron salt, an iron-cyanogen compound, a buffer salt and a soluble nitrite, drying the coated paper, exposing the coated paper and developing the print with an oxidizing solution of a zinc salt, and a phosphate.

14. A method for preparing blue prints which comprises applying to the paper a coating solution containing a soluble iron salt, an iron-cyanogen compound, a buffer salt and a soluble nitrite, drying the coated paper, exposing the coated paper and developing the print with a solution of zinc sulphate, mono sodium orthophosphate, magnesium sulphate and ammonium persulphate.

JOHN HOLDEN.